(12) United States Patent
Miyagi

(10) Patent No.: US 7,970,538 B2
(45) Date of Patent: Jun. 28, 2011

(54) ACCURATE GLOBAL POSITIONING SYSTEM FOR DELIVERIES

(76) Inventor: Masaaki Miyagi, Baton Rouge, LA (US)

( * ) Notice: Subject to any disclaimer, the term of this patent is extended or adjusted under 35 U.S.C. 154(b) by 0 days.

(21) Appl. No.: 12/535,808

(22) Filed: Aug. 5, 2009

(65) Prior Publication Data

US 2010/0235096 A1    Sep. 16, 2010

Related U.S. Application Data

(60) Provisional application No. 61/160,442, filed on Mar. 16, 2009.

(51) Int. Cl.
*G01C 21/30* (2006.01)
*G01C 21/32* (2006.01)

(52) U.S. Cl. ... 701/210; 701/200; 701/212; 340/995.14; 340/995.16; 340/995.22; 340/995.24; 340/995.25

(58) Field of Classification Search .......... 701/200, 701/210, 212; 340/995.14–995.17, 995.22, 340/995.24–995.25; 345/157, 163, 589; 382/293–300, 291, 113
See application file for complete search history.

(56) References Cited

U.S. PATENT DOCUMENTS

| | | | |
|---|---|---|---|
| 4,675,676 A | 6/1987 | Takanabe et al. | |
| 5,948,043 A * | 9/1999 | Mathis | 701/208 |
| 6,094,625 A * | 7/2000 | Ralston | 702/150 |
| 6,321,158 B1 | 11/2001 | DeLorme et al. | |
| 6,408,243 B1 | 6/2002 | Yofu | |
| 6,437,272 B2 | 8/2002 | Tamamoto et al. | |
| 6,469,663 B1 | 10/2002 | Whitehead et al. | |
| 6,470,265 B1 | 10/2002 | Tanaka | |
| 6,816,784 B1 | 11/2004 | Khan et al. | |
| 6,931,322 B2 | 8/2005 | Jung et al. | |
| 6,990,409 B2 | 1/2006 | Khan et al. | |
| 7,158,878 B2 | 1/2007 | Rasmussen et al. | |
| 7,305,350 B1 | 12/2007 | Bruecken | |
| 7,346,451 B2 | 3/2008 | Sakashita et al. | |
| 7,660,666 B2 * | 2/2010 | Finn et al. | 701/208 |
| 7,778,773 B2 * | 8/2010 | Yaqub et al. | 701/209 |
| 7,809,501 B2 * | 10/2010 | Listle et al. | 701/208 |
| 2003/0014212 A1 * | 1/2003 | Ralston et al. | 702/150 |
| 2009/0327071 A1 * | 12/2009 | Kreft | 705/14.49 |

FOREIGN PATENT DOCUMENTS

JP    2003162797 A    6/2003

OTHER PUBLICATIONS

Adomatis, Doug, "Make Your Own GPS Maps", Apr. 4, 2002, www.travelbygps.com.
www.smartphonemag.com/cms/forum/topic/7986, question posed online by unknown author, May 10, 2004.

* cited by examiner

*Primary Examiner* — Jack Keith
*Assistant Examiner* — Rami Khatib
(74) *Attorney, Agent, or Firm* — John B. Edel; Kean Miller LLP

(57) ABSTRACT

An accurate global positioning system having a receiver, a display screen, an input device, having capabilities for visual calibration of the system is disclosed. Further methods of operating that system are disclosed.

10 Claims, 2 Drawing Sheets

ACCURATE GLOBAL POSITIONING SYSTEM FOR DELIVERIES

CROSS REFERENCE TO RELATED APPLICATIONS

This application claims the benefit of U.S. provisional patent application Ser. No. 61/160,442 which is incorporated herein by reference.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BACKGROUND

Certain delivery services such as newspaper delivery require rapid and accurate individual identification of delivery locations. For example, a newspaper delivery taking place at night generally requires the limited visibility identification of variety of driveways or delivery points with many delivery points requiring delivery of different newspapers or a combination of newspapers. Existing systems to aid in the identification of the delivery points, such as Global Positioning Systems (GPS), have not met the need for fast and accurate identification and characterization of delivery points.

Information relevant to attempts to address these problems can be found in U.S. Pat. No. 7,346,451 entitled "Electronic device and program for displaying map;" U.S. Pat. No. 7,305,350 entitled "System for notifying an online client of a mobile vendor;" U.S. Pat. No. 7,158,878 entitled "Digital mapping system;" U.S. Pat. No. 6,990,409 entitled "Method and system using delivery trucks to collect address location data;" U.S. Pat. No. 6,931,322 entitled "Method for correcting position error in navigation system;" U.S. Pat. No. 6,816,784 entitled "Method and system using delivery trucks to collect address location data;" U.S. Pat. No. 6,470,265 entitled "Method and apparatus for processing digital map data;" U.S. Pat. No. 6,469,663 entitled "Method and system for GPS and WAAS carrier phase measurements for relative positioning;" U.S. Pat. No. 6,437,272 entitled "Article delivery system;" U.S. Pat. No. 6,408,243 entitled "Service delivery system;" and U.S. Pat. No. 6,321,158 entitled "Integrated routing/mapping information;" U.S. Pat. No. 4,675,676 entitled "Map display system." However, none of the references have adequately solved the above-described needs. For the foregoing reasons, there is a need for devices and methods that aid in the timely and accurate identification and characterization of delivery points.

SUMMARY

Disclosed herein are embodiments of the present invention that address the needs described above by providing devices and methods that assist in the rapid and accurate identification and characterization of delivery points. Among the uses of the devices and methods disclosed herein is the identification of individual driveways for delivery of newspapers.

A global positioning system having features of the present invention comprises a global positioning system receiver, a display screen, and an input device, wherein the display screen displays an indicated position of the global positioning system on a route image; wherein the route image has sufficient detail to depict at least one delivery point representation; wherein the route image displays a route representation and at least one landmark representation having sufficient proximity to the route representation to visually calibrate the global positioning system on at least one calibration point along a physical route; wherein the indicated position of the global positioning system can be manually adjusted relative to the route image. A method of delivering an item to a delivery point having features of the present invention comprises: viewing the above-described route image on the above-described global positioning system; operating the input device to change the indicated position relative to the route image; and delivering at least one item to at least one physical delivery point. A further method of delivering having features of the present invention comprises: viewing the above-described route image on the above-described global positioning system; comparing the spatial difference between a calibration point selected from said at least one calibration point and a physical landmark to the spatial difference between said indicated position and a landmark representation selected from said at least one landmark representation while at said calibration point selected from said at least one calibration point, wherein the landmark representation selected from said at least one landmark representation is a portrayal of said physical landmark; operating the input device to change the indicated position relative to the route image in a way that causes the global positioning system to accurately reflect the indicated position relative to the route image; and delivering at least one item to at least one physical delivery point when the indicated position is proximate to said at least one delivery point representation.

Certain embodiments of the invention provide the capability to differentiate delivery points having similar appearance and close proximity to one another. Other embodiments provide the capability to make corrections to a GPS-indicated location on a map throughout a delivery route. Additional embodiments provide the capacity to differentiate various types of delivery points from each other based on a graphical display.

DETAILED DESCRIPTION

Figure 1:
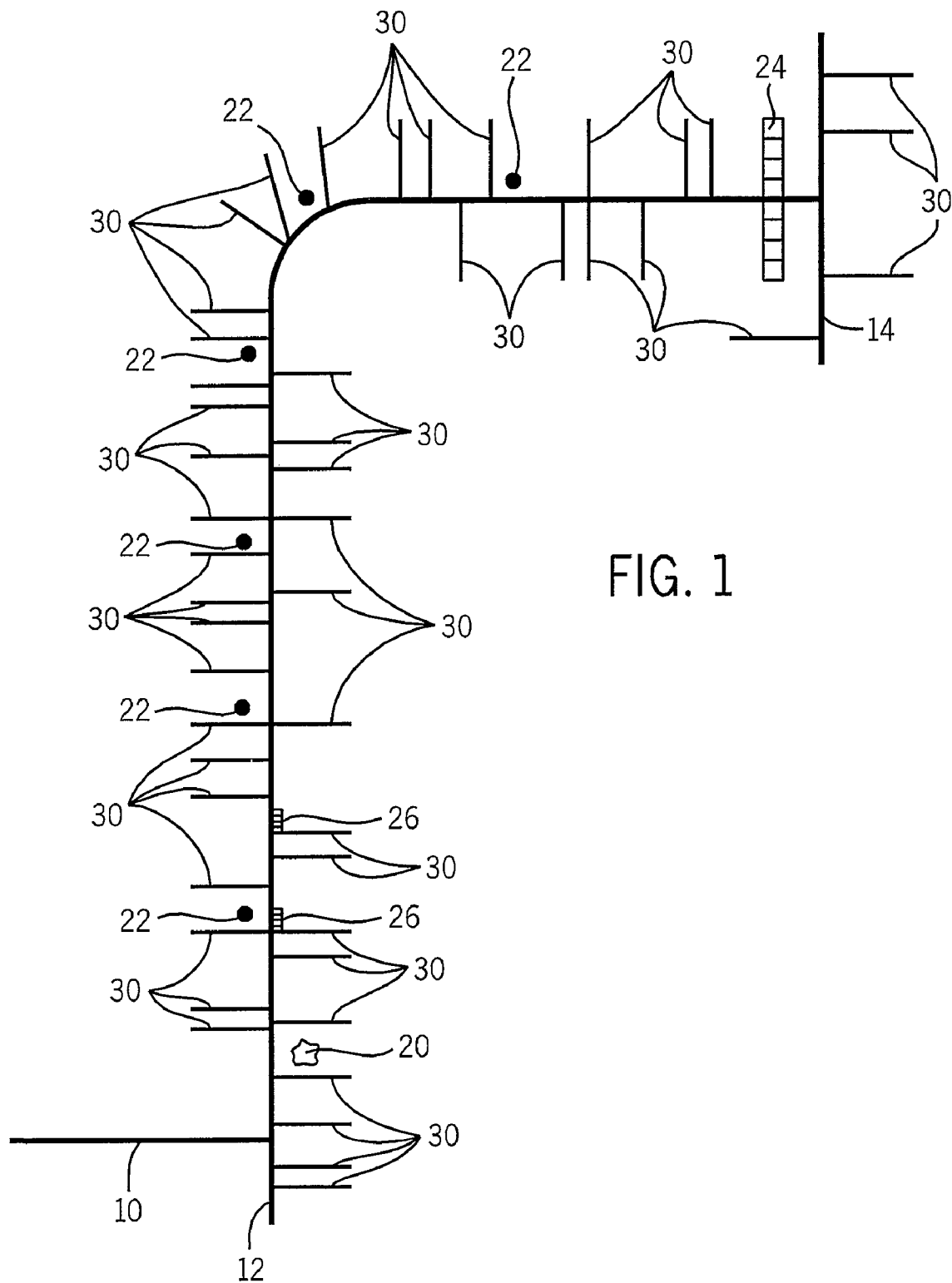
FIG. 1 shows a skeletal map of a delivery route containing indications of driveways along the delivery route.
Figure 2:
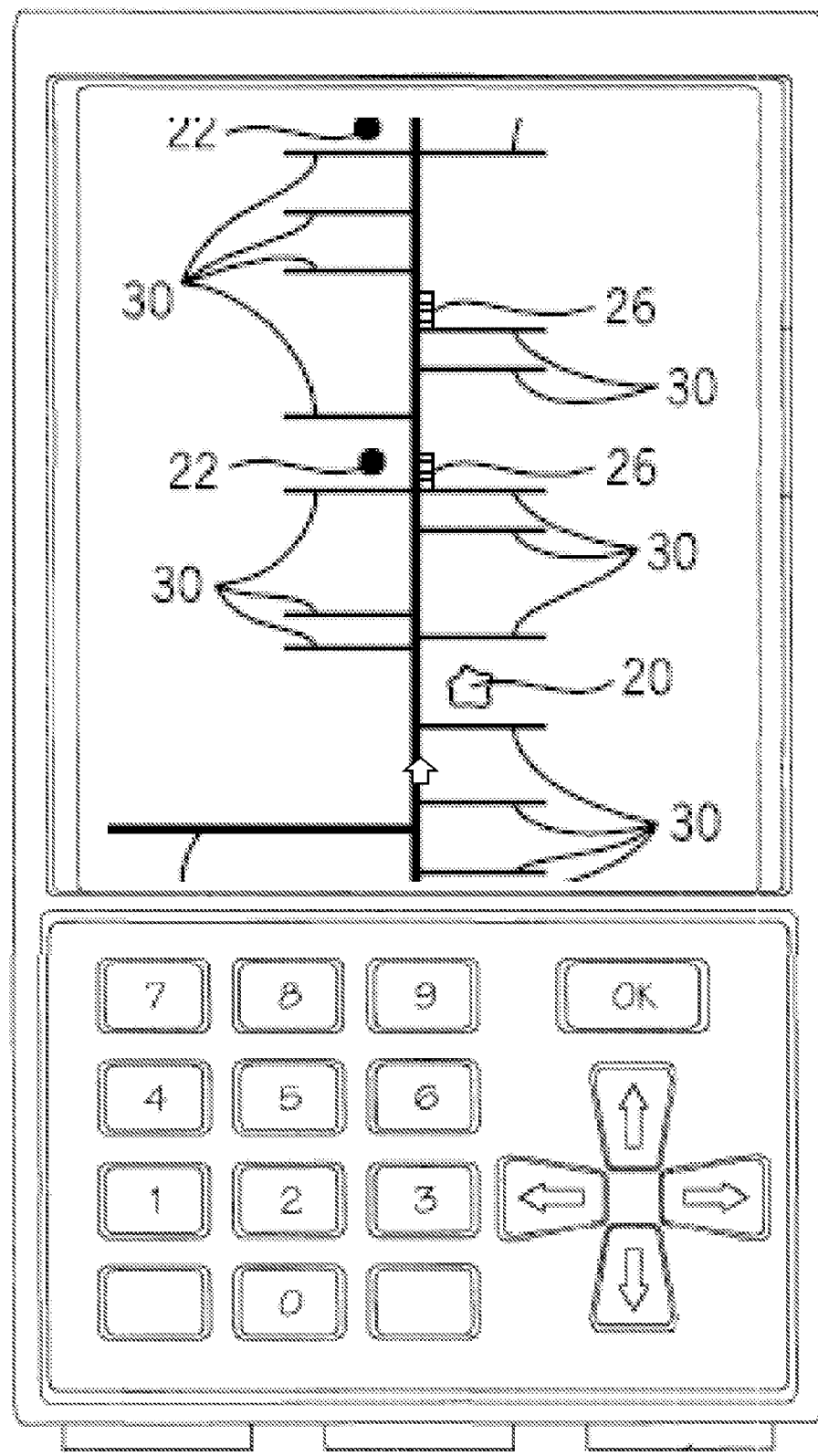
FIG. 2 shows a GPS device displaying a route image on a display screen.

GPS receivers and mapping systems are known in the art of computer assisted navigation. In addition, multiple means for enhancing the identified position of a GPS receiver are known, including Wide Area Augmentation System (WAAS), Differential GPS (DGPS), and others. Aspects of this invention provide for a level of accuracy for identifying the position of a GPS receiver on a map that exceeds the accuracy capabilities of WAAS, DGPS and other methods. The increased accuracy is achieved by either supplementing those known correction techniques with an additional correction or providing an independent correction that is more accurate than current techniques. The techniques disclosed herein also compensate for errors in applying GPS coordinates to maps that are not compensated for by other techniques. Currently GPS receivers are limited by atmospheric conditions as well as the physical surroundings of the receivers. These parameters change from day to day as well as location to location. Providing corrections that overcome these limitations as well as errors arising from signal interference from large structure, the interruption of signals from satellites and other devices communicating with the GPS and other similar sources of error is helpful to applications where accuracy is critical.

There are two types of error produced in a GPS receiver, systematic error and random error. Of these, only the systematic error is readily amenable to correction. The systematic error found in the GPS receiver is caused by the following phenomena:

1. Multipath-Variation in the path length taken by the radio wave emitted by the satellite to reach the GPS instrumentation is affected by the surrounding environment. Examples of these are tall building, large boulder, hills, etc. Since the environment is prone to change along a delivery route, provision must be made to correct the deviation produced in the various part of the route.
2. Atmospheric condition and shifting thicknesses of the various layers in the atmosphere affect the velocity of transmission of the radio wave from the satellite to the GPS receiver.
3. Variation in accuracy between the timing device in the satellite and in the GPS receiver.
4. Electronic noise of the GPS instrument used.
5. Deviation in the satellite's orbital height.

Some embodiments of the current invention may include, creating a map having sufficient detail to identify individual delivery points, calibrating that map for use in a GPS device, associating unique delivery points with positions on the map, loading the map and map data onto a GPS device, performing a primary calibration, and performing secondary calibrations to the device as necessary.

Map Creation

An image or map of the area to be traveled is required to make the described corrections. The map or image must be of sufficient resolution or detail to make visual comparisons of the indicated position of the delivery vehicle or GPS device on the GPS device with the actual position of the vehicle or device by reference to landmarks indicated both on the GPS device and present in the delivery driver's surroundings. Because in the case of newspaper delivery, newspapers are often delivered in the darkness of the night and the field of visibility is limited to the street and a short distance on either side of the street, an embodiment of the map may have a small number of features and yet provide all of the information needed. For example, in the case of newspaper delivery, the map should have an indication of each driveway or potential delivery point whether or not that delivery point is an intended target for delivery. In that case, the map must also allow the driver to anticipate the next several throws so that he or she can be prepared with a folded paper in hand. Other uses of the invention include the delivery of packages, flowers, mail, and the location of points for the delivery of services.

An embodiment of the invention contains a delivery map which meets these needs by providing a skeletal map containing features such as streets, driveways, and walkways adjoining the streets leading to each and every delivery location such as the skeletal map of FIG. 1. Now referring to FIG. 1 of the drawings which is a skeletal map of a delivery route, a first street 10 is connected to a second street 12 which is connected to a third street 14. Together streets 10, 12, and 14 make up the delivery route. Landmarks along the delivery route include a tree 20, lamp posts 22, railroad tracks 24, and storm drains 26. Potential delivery points on the map are the driveways 30.

In an embodiment of the invention those driveways and walkways are identified by the house address. The location and the dimensions of these driveways and walkways may be represented with a high level of precision as these driveways and walkways may be used as a secondary calibration point when necessary. The geographically accurate map can be developed from a satellite image, aerial photograph, subdivision map, physical measurement, or any other similarly detailed depiction of the delivery route. The techniques for preparation of a base map having sufficient detail for use in this application would be apparent to a person having skill in the art of cartography, geographic information science or geographic information systems.

Map Features

In an embodiment of the invention the map contains a level of detail and sufficient marking of landmarks to allow visual calibrations of the map. This level of detail is also important because drivers often have a limited field of vision when driving, particularly at night or in adverse weather conditions. Landmarks for such visual calibrations may be in close proximity to the path traveled, may be easily recognized when on the route, and may be distributed throughout the route. Examples of landmarks are stop signs, other traffic signs, telephone poles, intersections, fire hydrants, cross walks, street drainage grading, driveways, and street lights. In addition to having utility as secondary calibration points, landmarks assist the delivery driver in the confirmation of his or her location.

In another embodiment of the invention, the image of the route consists essentially of a representation of that route, significant streets that are adjacent to the route, at least one representation of a landmark, and at least one representation of a delivery point.

Unique Delivery Points

In an embodiment of the invention, points of delivery are associated with the GPS map with a degree of accuracy sufficient to identify individual targets for delivery such as walkways, driveways, mailboxes, houses, and businesses. The delivery points may be associated with the street addresses of the delivery locations. Utilizing the individual targets for delivery, a delivery plan can be implemented which identifies which delivery targets receive which deliveries. That plan can be displayed to the delivery driver by a visual indication associated with the delivery that is displayed on the GPS Map. An example of such a display applied in the field of newspaper delivery would be driveways or walkways of customers being color coded on the GPS map with the individual colors associated with the newspapers to be received. Red colored driveways would represent the local newspaper; blue colored driveways would represent another paper, such as the Wall Street Journal, etc. Each day, the delivery plan would be updated as required. Turn-by-turn directions to cover the delivery area can be manually entered or currently available software can be used to determine the most efficient manner of delivery. Other embodiments of the invention include devices and methods for the delivery of packages, mail, and other articles that are delivered.

Map Calibration

Once prepared, a base map having sufficient detail to identify all potential delivery points on a delivery route and other reference points, as described above, would then be calibrated in a way that would make all positions on the map correspond to latitude and longitude coordinates. This can be done by selecting multiple places on the map image that correspond to known GPS coordinates and adjusting the map such that all positions on the map correspond with a GPS position. Currently available GPS mapping software can be used for this purpose. A potential example of such software is GPS TrackMaker®, available at http://www.gpstm.com/. Each potential delivery point, such as an individual driveway, may be uniquely identified and associated with the map. Those identified points may be associated with a delivery addresses.

Loading the Map onto the GPS

Multiple commercially available GPS devices have the capability to upload a maps calibrated for GPS. Any such device may be used which is capable of the later described secondary adjustments. The GPS calibrated map is loaded onto such a GPS device.

In an embodiment of the invention, before use of the GPS receiver, the receiver may be checked for proper operation. Once it is determined that the device is operating properly, the calibration of the instrument can proceed.

Primary Calibration

A primary calibration may be done prior to the commencement of delivery. Doing so will correct the systematic errors described above. Performing the primary calibration requires a primary calibration point which is defined as a location for which the exact latitude and longitude are known. Such a calibration point may be determined by an accurate survey. To perform the primary calibration, the GPS instrument or the antenna of the instrument is to be placed on the calibration point and the latitude, longitude, and elevation are measured by the GPS receiver. If any of the measurements deviate from those known parameters of the calibration point, a correction factor is calculated and applied to the instrumental readings. The GPS device should have the software to perform the manipulations of data described herein in a way that accurately corrects the indicated position of the GPS device. The result of this correction should be that the indicated position on the GPS map is an accurate reflection of actual position.

Positional corrections can be done by a straightforward calibration factor for the longitude and latitude. An example of such a calibration factor is calculated as follows.

Let "a" be the actual reading of the longitude
Let "x" be the longitude of the calibration point
Then,
    Correction factor "L"="x"/"a".
    Where the corrected reading="L" x "a"

However a wide variety of algorithms for making such corrections could be used and applicant does not wish to be bound by the above manner of correction.

Now, the same procedure is applied to the latitude measured. The correction factor in the above equation can be applied to the measured value per the above examples or can be applied to the coordinates of the map which will linearly transform the entire map to agree with the uncorrected instrumental readings.

Primary calibration and the checking of the instrument can be accomplished at the same time. The calibration and checking of the instrument can be accomplished as follows: 1) place the antenna on the primary calibration point located at the originating point for the delivery; 2) obtain the longitude and the latitude; 3) check that the measurement is within the 99% confidence level; 4) calibrate the instrument based on the differences between the measured location and the actual location. If the instrument is within the 99% confidence level, it can be assumed to be properly operating. The 99% confidence levels can be established by statistical means for each instrument. When this is not possible, the secondary calibration procedure described below is sufficient.

Secondary or Visual Calibration

Under ideal conditions, once the GPS receiver is calibrated, further calibration is no longer necessary. However, in practice, this is not the case. The factors causing the error in the GPS readings will change depending on the location. That is, the factor affecting the GPS receiver at the beginning of the route will be different from that on the other parts of the route. Thus a single point calibration does not produce the necessary correction needed for the entire route. This requires that the receiver must have the capability of being recalibrated at any point on the route. It is not economically feasible to have multiple primary calibration points dispersed throughout the entire route. However, it is economically feasible to have multiple visual calibration points along the route.

When the carrier comes to the delivery site, the instrument's calibration may be confirmed by stopping in front of the first delivery point or driveway at the beginning of the delivery route. If the initial calibration remains correct, the position indicated will be correctly located in front of the delivery point or driveway. However, if the position indicated on the GPS map is not correct based on a visual comparison to surrounding landmarks, the instrument should be recalibrated. At this point, calibration may be done by a secondary calibration or visual calibration. The secondary calibration can be accomplished by noting the position of the delivery vehicle relative to one or more surrounding landmarks and repositioning the position indicator relative to the underlying GPS map. Such repositioning can take the form of causing translational movement of the map while the position indicator remains fixed or movement of the position indicator on the map. The result in either case is that the location of the position indicator (which represents the vehicle) is correctly located on the GPS map. When the map is moved, the type of movement may be characterized as "hook and drag." This calibration may be accomplished using any appropriate input device such as a mouse, touch screen or keypad. The direction and magnitude of the repositioning of the position indicator relative to the map is used to recalculate the calibration factor (s) which are to be used until the next recalibration. This secondary calibration has the advantage of accurately placing the delivery driver at the correct position on the GPS map with sufficient accuracy to allow the identification and differentiation of unique delivery points as the delivery vehicle approaches those points. If the accuracy of the receiver drifts further down the route and is in need of correction, the procedure can be repeated on any driveway or any recognizable position on the map, such as an intersection, street sign, etc., that is on the map. This feature allows the receiver to be calibrated at nearly any point in the route so as to continuously maintain the ability to accurately identify and differentiate closely spaced unique delivery points. This feature allows for the successful use of the GPS for any delivery system.

A particular embodiment of the invention demonstrating how to perform the map translation using a mouse as an input device would be: (1) notice position error; (2) click on the map (holding the mouse button); (3) drag the map into the correct placement under the position indicator; (4) release the mouse button completing the calibration. The driver would then proceed along the delivery route until the position indicator is out of calibration again, at which time steps 3-4 would be repeated. Steps 1-4 can be performed as many times as is useful to aid in accurate identification of delivery points. These steps can be performed at a calibration point that is substantially adjacent to a landmark that is represented on the GPS device. In an embodiment of the invention, there are a series of representation of landmarks on the GPS device that can be utilized for such calibrations. Accordingly, multiple points along the route may be utilized as points of calibration.

The GPS receiver used may have a cursor with dimensions similar to the delivery vehicle (length and width) with the center of this cursor being the actual location. For example, the position indicator could be dimensioned to represent a vehicle having real world dimensions of approximately 14 feet long and 8 feet wide, with the actual position being in the dead center. A position indicator of this dimension or another dimension matched to the desired delivery vehicle will aid the secondary calibration procedure by providing a better frame of reference during calibrations.

Any and all references to patents, documents, and other writings contained herein shall not be construed as an admission as to their status with respect to being or not being prior art.

There are, of course, other alternate embodiments which are obvious from the foregoing descriptions of the invention, which are intended to be included within the scope of the invention, as defined by the following claims.

I claim:

1. A method of delivery comprising:
   a. providing a global positioning system wherein the global positioning system comprises a global positioning system receiver and a display screen;
   b. displaying a route image on the display screen wherein the route image is representative of an physical route;
   c. displaying an indicated position on the display screen wherein the indicated position is representative of a actual position on the physical route;
   d. displaying a first delivery point representation on the display screen wherein the first delivery point representation is representative of an first physical delivery point along the physical route;
   e. displaying a landmark representation on the display screen wherein the landmark representation is representative of a physical landmark;
   f. observing the physical relationship between a actual position and the physical landmark;
   g. observing a represented relationship between the indicated position and the landmark representation;
   h. recognizing a difference between the physical relationship and the represented relationship;
   i. providing a manual input to the global positioning system that is proportional to the magnitude of the difference wherein the manual input causes a perceived motion selected from movement of the route image relative to the indicated position and
   movement of the indicated position relative to the route image,
   and the perceived motion substantially eliminates the difference;
   j. delivering a first item to the first physical delivery point when the indicated position is adjacent to the first delivery point representation on the display screen.

2. The method of delivery of claim 1 wherein the display screen is a touch screen input device.

3. The method of delivery of claim 1 wherein the first item is a newspaper.

4. The method of delivery of claim 1 wherein the first item is a package.

5. The method of delivery of claim 1 wherein the first physical delivery point is a driveway.

6. The method of delivery of claim 1 further comprising delivering a second item to a second physical delivery point wherein an actual distance representative of the difference between the physical relationship and the represented relationship is greater than the distance between the first physical delivery point and the second physical delivery point.

7. The method of delivery of claim 1 further comprising delivering a second item to a second physical delivery point when the indicated position is adjacent to a second delivery point representation on the display screen, wherein the second item is substantially distinct from the first item, and wherein the second delivery point representation identifies the second physical delivery point as a location in need of an item that is substantially distinct from the first item.

8. The method of delivery of claim 1 wherein the route image is a skeletal map of the physical route.

9. The method of delivery of claim 1 further comprising delivering a second item to a second physical delivery point when the indicated position is adjacent to a second delivery point representation on the display screen,
   wherein the second item is substantially distinct from the first item, and
   wherein the second delivery point representation identifies the second physical delivery point as a location in need of an item that is substantially distinct from the first item;
   wherein an actual distance representative of the difference between the physical relationship and the represented relationship is greater than the distance between the first physical delivery point and the second physical delivery point;
   wherein the first item is a newspaper;
   wherein the first physical delivery point is a driveway.

10. The method of delivery of claim 1 wherein the delivering of the first item is carried out in a delivery vehicle and the indicated position is substantially representative of the size of the vehicle in comparison to the route image.

* * * * *